US012743632B2

(12) United States Patent
Srinivasa et al.

(10) Patent No.: US 12,743,632 B2
(45) Date of Patent: Sep. 22, 2026

(54) DEBUGGING IN FEDERATED LEARNING SYSTEMS

(71) Applicant: Cisco Technology, Inc., San Jose, CA (US)

(72) Inventors: Jayanth Srinivasa, San Jose, CA (US); Myungjin Lee, Bellevue, WA (US); Ramana Rao V. R. Kompella, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 694 days.

(21) Appl. No.: 18/196,062

(22) Filed: May 11, 2023

(65) Prior Publication Data

US 2024/0378455 A1 Nov. 14, 2024

(51) Int. Cl.

| | |
|---|---|
| ***G06N 3/098*** | (2023.01) |
| ***G06N 3/0455*** | (2023.01) |
| ***G06N 3/08*** | (2023.01) |
| ***G06N 3/084*** | (2023.01) |
| ***G06N 3/088*** | (2023.01) |
| ***G06N 3/09*** | (2023.01) |
| ***G06N 20/00*** | (2019.01) |
| ***G06N 20/20*** | (2019.01) |
| ***G06V 10/776*** | (2022.01) |

(52) U.S. Cl.

CPC ........... *G06N 3/098* (2023.01); *G06N 3/0455* (2023.01); *G06N 3/08* (2013.01); *G06N 3/084* (2013.01); *G06N 3/088* (2013.01); *G06N 3/09* (2023.01); *G06N 20/00* (2019.01); *G06N 20/20* (2019.01); *G06V 10/776* (2022.01)

(58) Field of Classification Search

CPC ........ G06N 3/098; G06N 20/00; G06N 20/20; G06N 3/084; G06N 3/08; G06N 3/09; G06N 3/0455; G06N 3/088; G06V 10/776

See application file for complete search history.

(56) References Cited

U.S. PATENT DOCUMENTS

| | | | |
|---|---|---|---|
| 9,239,986 | B2 | 1/2016 | Lin et al. |
| 10,740,694 | B2 | 8/2020 | Harvill et al. |
| 11,397,924 | B1 | 7/2022 | Moghaddam et al. |

(Continued)

FOREIGN PATENT DOCUMENTS

| | | |
|---|---|---|
| WO | 2021115480 | 6/2021 |

OTHER PUBLICATIONS

Awan, et al., "Contra: Defending Against Poisoning Attacks in Federated Learning", online: http://www.ittc.ku.edu/~fli/papers/2021_esorics_contra.pdf, Jan. 2021, 20 pages, European Symposium on Research in Computer Security, National Science Foundation.

(Continued)

*Primary Examiner* — Quoc A Tran
(74) *Attorney, Agent, or Firm* — Lee & Hayes, P.C.

(57) ABSTRACT

In one embodiment, a device makes a determination that performance of a global model generated by aggregating local models trained by a plurality of trainer nodes in a federated learning system has experienced a degradation. The device selects, in response to the determination, a particular trainer node from among the plurality of trainer nodes to generate debugging metrics. The device provides an indication that the particular trainer node is a root cause of the degradation.

20 Claims, 9 Drawing Sheets

(56) References Cited

U.S. PATENT DOCUMENTS

| | | | | |
|---|---|---|---|---|
| 2023/0068386 | A1* | 3/2023 | Akdeniz | G06N 3/084 |
| 2023/0290456 | A1* | 9/2023 | Baror | G16H 30/20 |
| 2023/0316141 | A1* | 10/2023 | Toporek | G16H 10/60<br>706/12 |

OTHER PUBLICATIONS

Xue, et al., "Towards Understanding the Influence of Individual Clients in Federated Learning", online: https://arxiv.org/abs/2012.10936, Apr. 2021, 8 pages.
Li, et al., "Privacy-Preserving Efficient Federated-Learning Model Debugging", IEEE Transactions on Parallel and Distributed Systems, vol. 33, Issue 10, Oct. 2022, pp. 2291-2303, IEEE.
Li, et al., "Efficient Federated-Learning Model Debugging", IEEE 37th International Conference on Data Engineering (ICDE), Apr. 2021, pp. 372-383, IEEE.

* cited by examiner

DEBUGGING IN FEDERATED LEARNING SYSTEMS

TECHNICAL FIELD

The present disclosure relates generally to computer networks, and, more particularly, to debugging in federated learning systems.

BACKGROUND

Federated learning has garnered increased interest in recent years due to its ability to train more robust AI models, as well as its privacy protecting capabilities. For instance, consider the case of a set of different hospitals across the world, each of which stores X-ray images from their own patients. Sharing such medical information to the cloud for model training, or even between one another, may be undesirable (or even illegal), in many circumstances. With federated learning, however, models can be trained at each of the sites and using their own local data. The resulting model parameters can then be aggregated to form a global model that has been trained using the X-ray images across all of the hospitals, but in a manner that does not require those images to actually be shared.

Unlike traditional model training, though, debugging poor model performance in a federated learning system can be challenging. For instance, consider the case in which the performance of the resulting model has decreased significantly over one or more rounds of training. In a traditional system, one could simply look at factors such as the training dataset, to diagnose the drop in performance (e.g., perhaps some training images were mislabeled, etc.). However, in federated learning systems, the underlying training datasets are not shared, meaning that it is particularly challenging to pinpoint the local training nodes and their local models that led to the poor performance of the global model.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
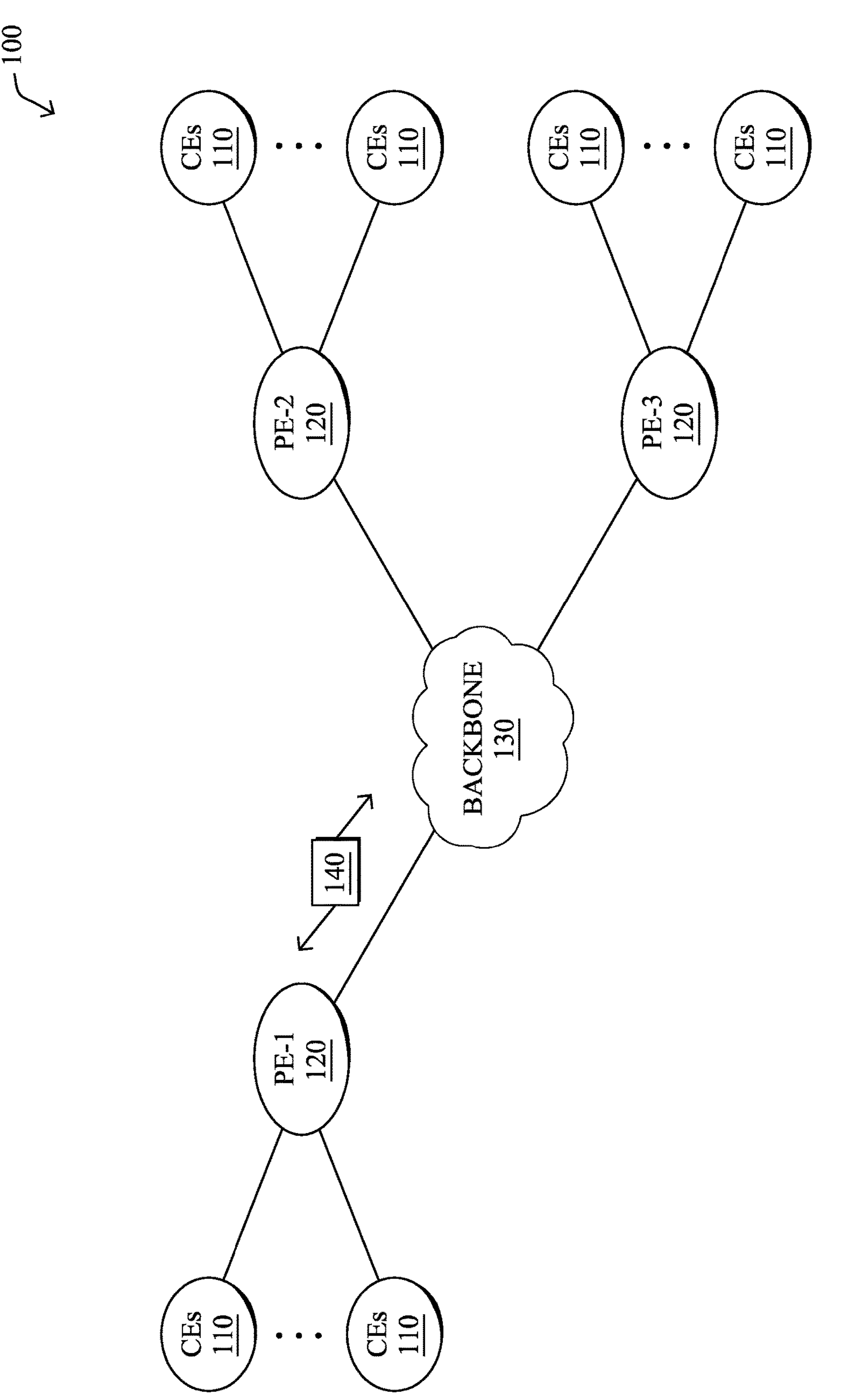
FIGS. 1A-1B illustrate an example communication network.

According to one or more embodiments of the disclosure, a device makes a determination that performance of a global model generated by aggregating local models trained by a plurality of trainer nodes in a federated learning system has experienced a degradation. The device selects, in response to the determination, a particular trainer node from among the plurality of trainer nodes to generate debugging metrics. The device obtains the debugging metrics from the particular trainer node. The device provides an indication that the particular trainer node is a root cause of the degradation.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example network 100 (e.g., a computer network) illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
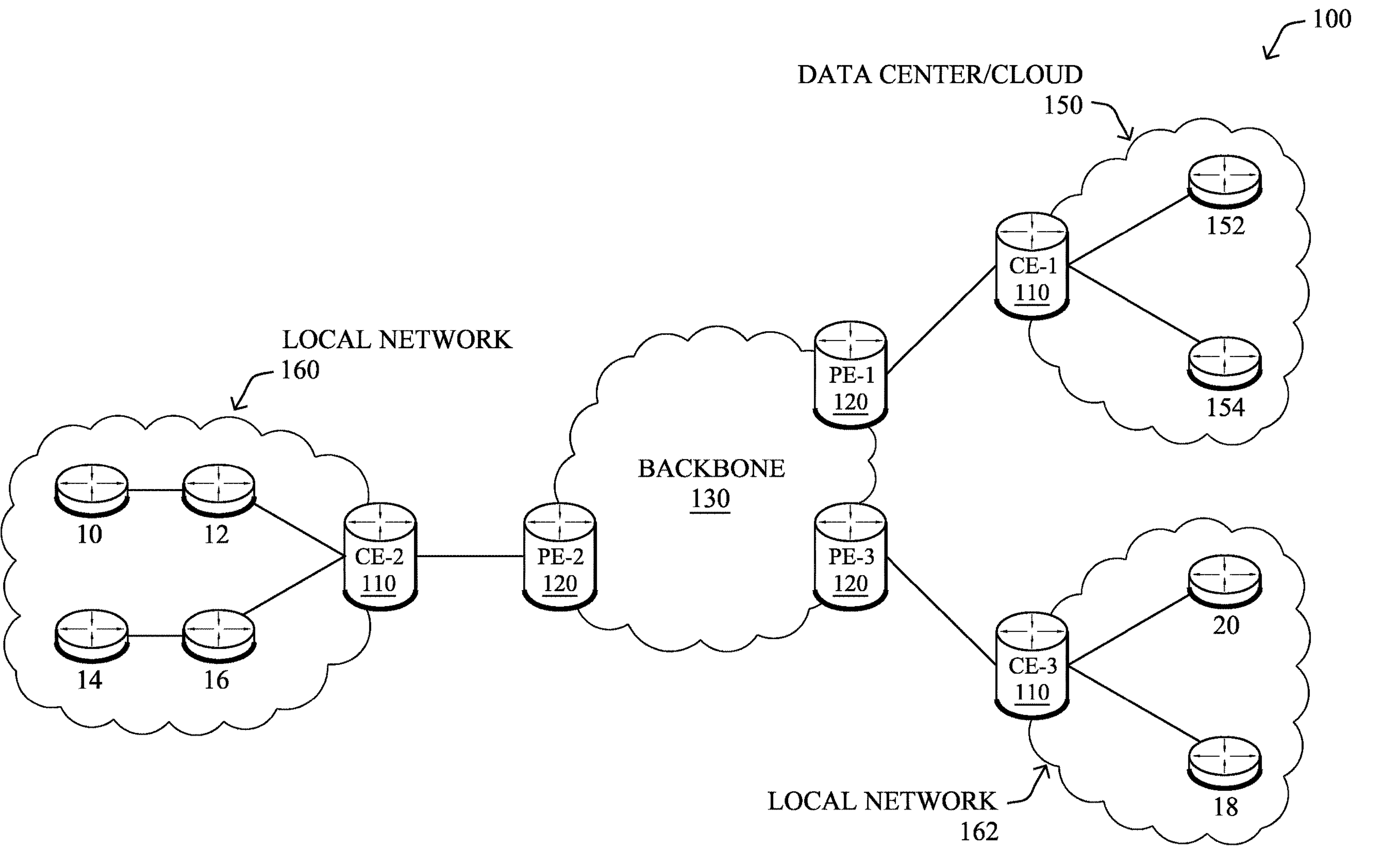

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
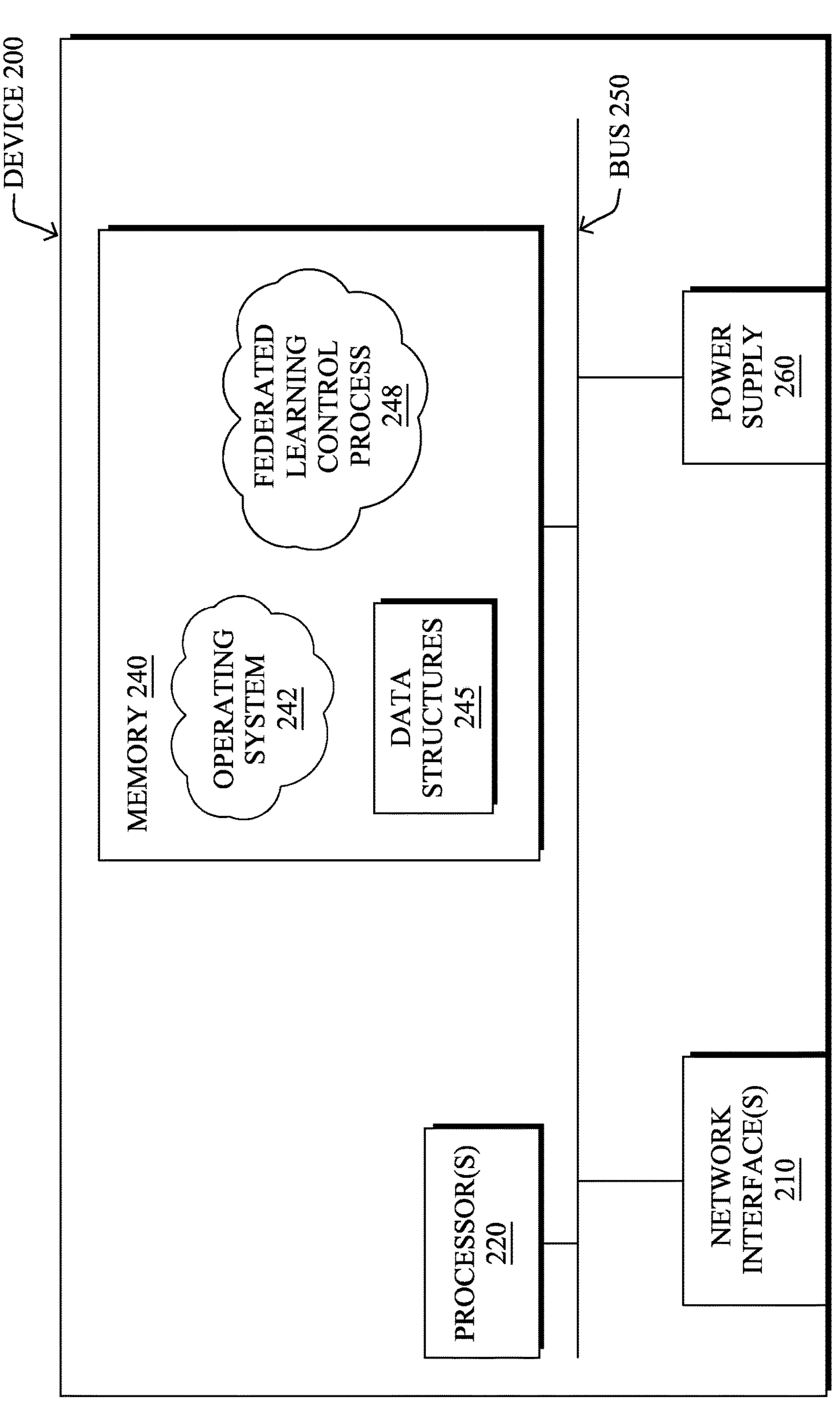
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise federated learning control process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In various embodiments, as detailed further below, federated learning control process 248 may also include computer executable instructions that, when executed by processor(s) 220, cause device 200 to perform the techniques described herein. To do so, in some embodiments, federated learning control process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, federated learning control process 248 may employ, or be responsible for the deployment of, one or more supervised, unsupervised, or semi-supervised machine learning models. Generally, supervised learning entails the use of a training set of data, as noted above, that is used to train the model to apply labels to the input data. For example, the training data may include sample image data that has been labeled as depicting a particular condition or object. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that federated learning control process 248 can employ, or be responsible for deploying, may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

Unfortunately, running a machine learning workload is a complex and cumbersome task, today. This is because expressing a machine learning workload is not only tightly coupled with infrastructure resource management, but also embedded into the machine learning library that supports the workload. Consequently, users responsible for machine learning workloads are often faced with time-consuming source code updates and error-prone configuration updates in an ad-hoc fashion for different types of machine learning workloads, which may be used to perform tasks such as aggregated model training, performing inferences on a certain dataset, or the like. However, defining a machine learning workload, especially across a distributed set of nodes/sites, can also be a very cumbersome and error-prone task.

To simplify the definition of a workload, the techniques herein propose decomposing machine learning workloads into primitives/building blocks and decoupling core building blocks (e.g., the AI/ML algorithm) of the workload from the infrastructure building blocks (e.g., network connectivity and communication topology). The infrastructure building blocks are abstracted so that the users can compose their workloads in a simple and declarative manner. In addition, scheduling the workloads is straightforward and foolproof, using the techniques herein.

In various embodiments, the techniques herein propose representing a machine learning workload using the following building block types:

- Role—this is logical unit that defines behaviors of a component. Hence, role contains a software piece. Role allows an artificial intelligence (AI)/machine learning (ML) engineer to focus on behaviors of a component associated with a role. At runtime, a role may consist of one or more instances, but the engineer only needs to work on one role at a time during the workload design phase without the need to understand any runtime dependencies or constraints.
- Channel—this is a logical unit that abstracts the lower-layer communication mechanisms. In some embodiments, a channel provides a set of application programming interfaces (APIs) that allow one role to communicate with another role. Some of key APIs are ends( ), broadcast( ), send( ), and recv( ). Function ends( ) returns a set of nodes attached to the other end of a given channel. With this function, a node on one side of the channel can choose other nodes at the other end of the channel and subsequently call send( ) and recv( ) to send or receive data with each node. In some implementations, a channel may eliminate any source code changes, even when the underlying communication mechanisms change.

Roles and channels may also have various properties associated with them, to control the provisioning of a machine learning workload. In some embodiments, these properties may be categorized as predefined ones and extended ones. Predefined properties may be essential to support the provisioning and set by default, whereas extended properties may be user-defined. In other words, to enrich the functionality of the roles and channels, the user/engineer may opt to customize extended properties.

By way of example, a role may have either or both of the following pre-defined properties:

Replica—this property controls the number of role instances per channel. By default, this may be set to one, meaning there is one role instance per channel. However, a user may elect to set this property to a higher value, as desired.

Load Balance—this property provides the ability to load balance demands given to the role instances and to do fail-overs.

For a channel, there may be the following property:

Group By—this property accepts a list of values so that communication between roles in a channel are controlled by using the specified values. For example, this property can be used to control the communication boundary, such as allowing communications only in a specified geographic area in this property (e.g., U.S., Europe, etc.).

Using the above building blocks and properties, the system can greatly simplify the process for defining a machine learning workload for a user.

Figure 3:
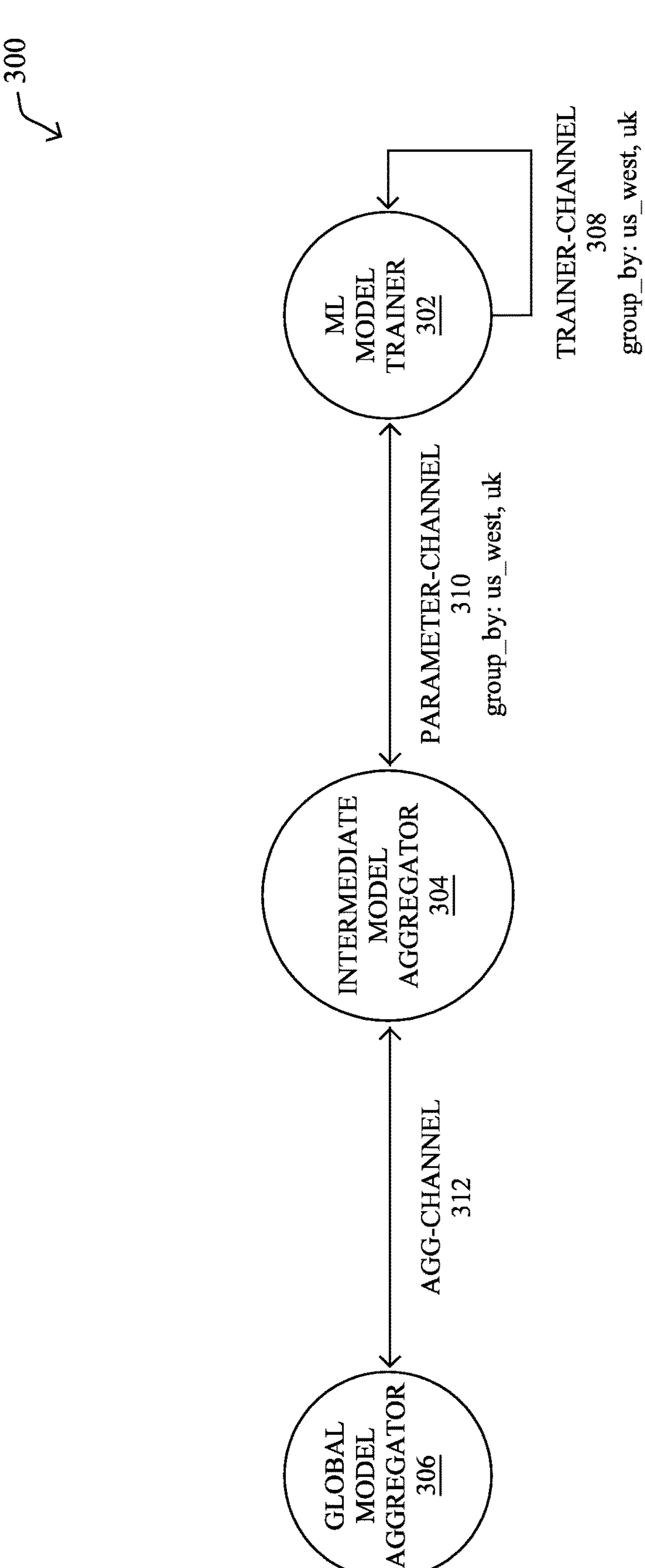
FIG. 3 illustrates an example template for a machine learning workload.

FIG. 3 illustrates an example template 300 for a machine learning workload, according to various embodiments. As shown, assume that a user wants to define a machine learning workload to train a machine learning model using data stored at different geographic locations. In a simple implementation, each site could simply transfer their respective datasets to a central location at which a model may be trained on that data. However, there are many instances in which the data is private, thereby preventing it from being sent off-site. For example, the datasets may include personally identifiable information (PII) data, medical data, financial data, or the like, that cannot leave their respective sites.

As shown, workload design template 300 consists of three roles: machine learning (ML) model trainer 302, intermediate model aggregator 304, and global model aggregator 306. Connecting them in template 300 may be three types of channels: trainer channel 308, parameter channel 310, and aggregation channel 312.

Trainer channels allows communication between peer trainer nodes at runtime. For instance, assume that the group by property is set to group trainer nodes into separate groups located in the western U.S. and the UK. In such a case, trainer channels may be provisioned between these nodes. Similarly, a parameter channel may enable communications between intermediate model aggregators, such as intermediate model aggregator 304 and trainer nodes in the various groups, such as model trainer 302. Finally, an aggregation channel may connect the intermediate model aggregator to global model aggregator 306.

Figure 4:
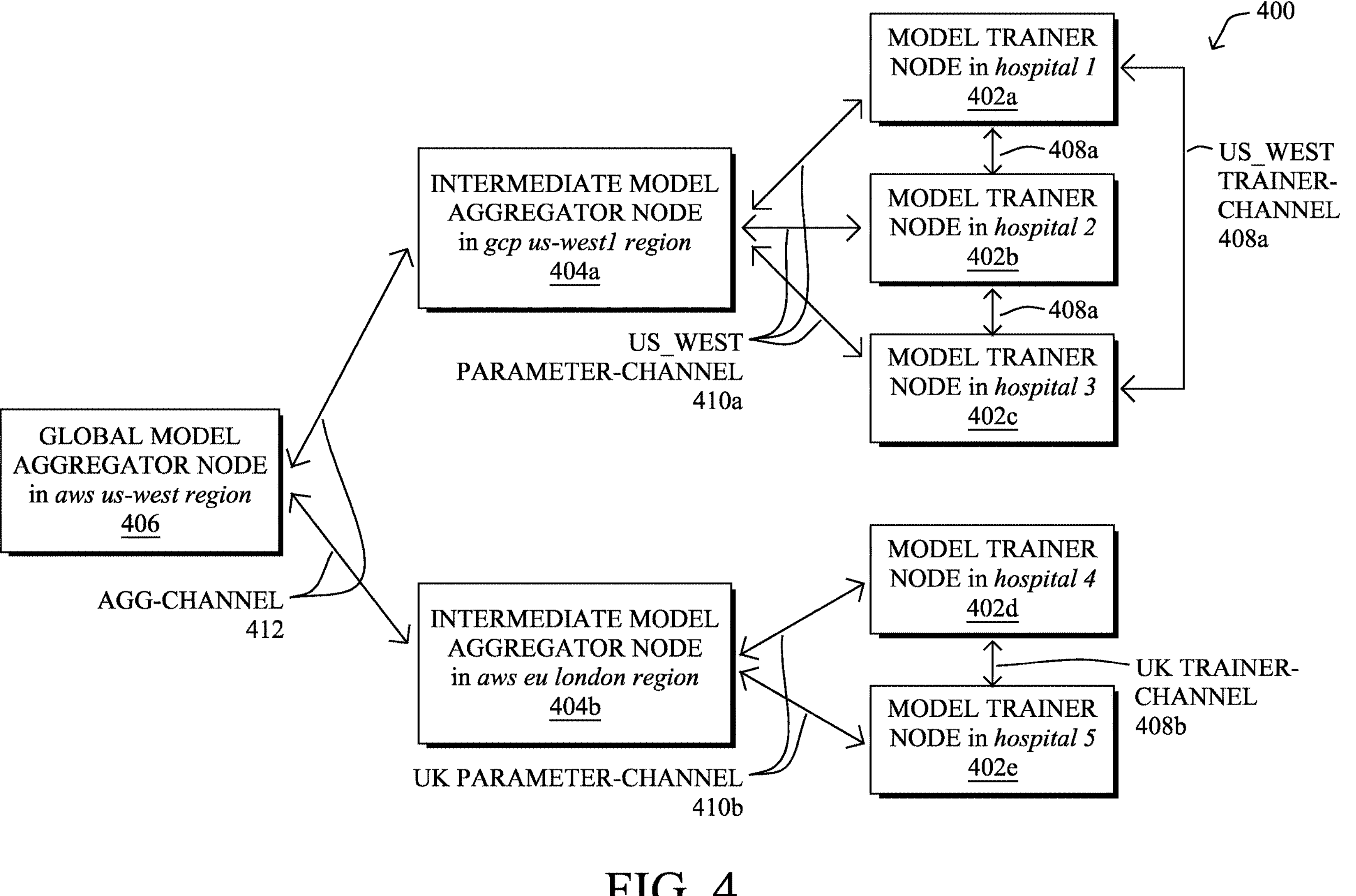
FIG. 4 illustrates an example of a machine learning workload defined in accordance with the template of FIG. 3.

FIG. 4 illustrates an example of a machine learning workload 400 defined in accordance with the template of FIG. 3, according to various embodiments. As shown, assume that the goal of the machine learning workload is to train a machine learning model to detect certain features (e.g., tumors, etc.) within a certain type of medical data (e.g., X-rays, MRI images, etc.). Such medical data may be stored at different hospitals or other locations across different geographic locations. For instance, assume that the medical data is spread across different hospitals located in the UK and the western US, each of which maintains its own training dataset.

To provision the machine learning workload across the different hospitals, a user may convey, via a user interface, definition data for the workload. For instance, the user may specify the type of model to be trained, values for the replica property, the number of datasets to use, tags for the group by property, any values for the load balancing property, combinations thereof, or the like.

Based on the definition data, the system may identify that the needed training datasets are located at nodes 402*a*-402*e* (e.g., the different hospitals). Note that the user does not need to know where the data is located during the design phase for machine learning workload 400, as the system may automatically identify nodes 402*a*-402*e*, automatically, using an index of their available data. In turn, the system may designate each of nodes 402*a*-402*e* as having training roles, meaning that each one is to train a machine learning model in accordance with the definition data and using its own local training dataset. In other words, once the system has identified nodes 402*a*-402*e* as each having training datasets matching the requisite type of data for the training, the system may provision and configure each of these nodes with a trainer role.

Assume now that the group by property has been set to group nodes 402*a*-402*e* by their geographic locations. Consequently, nodes 402*a*-402*c* may be grouped into a first group of trainer/training nodes, based on these hospitals all being located in the western US, by being tagged with a "us_west" tag. Similarly, nodes 402*d*-402*e* may be grouped into a second group of training nodes, based on these hospitals being located in the UK, by being tagged with a "uk" tag.

For purposes of simplifying this example, also assume that the replica property is set to 1, by default, meaning that there is only one trainer role instance to be configured at each of nodes 402*a*-402*e*.

To connect the different sites/nodes 402*a*-402*e* in each group, the system may also provision and configure trainer channels between the nodes in each group. For instance, the system may configure trainer channels 408*a* between nodes 402*a*-402*c* within the first geographic group of nodes, as well as a trainer channel 408*b* between nodes 402*d*-402*e* in the second geographic group of nodes.

Once the system has identified nodes 402*a*-402*e*, it may also identify intermediate model aggregator nodes 404*a*-404*b*, to support the groups of nodes 402*a*-402*c* and 402*d*-402*e*, respectively. In turn, the system may configure model aggregator nodes 404*a*-404*b* with intermediate model aggregation roles. In addition, the system may configure parameter channels 410*a*-410*b* to connect the groups of nodes 402*a*-402*c* and 402*d*-402*e* with intermediate model aggregator nodes 404*a*-404*b*, respectively. These parameter channels 410*a*-410*b*, like their respective groups of nodes 402, may be tagged with the "us_west" and "uk" tags, respectively. In some instances, intermediate model aggregator nodes 404*a*-404*b* may be selected based on their distances or proximities to their assigned nodes among nodes 402*a*-402*e*. For instance, intermediate model aggregator node 404*b* may be cloud-based and selected based on it being in the same geographic region as nodes 402*d*-402*e*. Indeed, intermediate model aggregator node 404*a* may be provisioned in the Google cloud (gcp) in the western US, while intermediate model aggregator node 404*b* may be provisioned in the Amazon cloud (AWS) in the UK region.

During execution, each trainer node 402*a*-402*e* may train a machine learning model using its own local training dataset. In turn, nodes 402*a*-402*e* may send the parameters of these trained models to their respective intermediate model aggregator nodes 404*a*-404*b* via parameter channels 410*a*-410*b*. Using these parameters, each of intermediate model aggregator nodes 404*a*-404*b* may form an aggregate machine learning model. More specifically, intermediate model aggregator node 404*a* may aggregate the models trained by nodes 402*a*-402*c* into a first intermediate model and intermediate model aggregator node 404*b* may aggregate the models trained by nodes 402*d*-402*e* into a second aggregate model.

Finally, the system may also provision machine learning workload 400 in part by selecting and configuring global model aggregator node 406. Here, the system may configure a global aggregation role to global model aggregator node 406 and configure aggregation channels 412 that connect it to intermediate model aggregator nodes 404*a*-404*b*. Note that these aggregation channels may not be tagged with a geographic tag, either.

Once configured and provisioned, intermediate model aggregator nodes 404*a*-404*b* may send the parameters for their respective intermediate models to global model aggregator node 406 via aggregation channels 412. In turn, global model aggregator node 406 may use these model parameters to form a global, aggregated machine learning model that can then be distributed for execution. As a result of the provisioning by the system, the resulting global model will be based on the disparate training datasets across nodes 402*a*-402*e*, and in a way that greatly simplifies the definition process of the machine learning workload used to train the model.

As noted above, federated learning has garnered increased interest in recent years due to its ability to train more robust AI/ML models, as well as its privacy protecting capabilities. For instance, consider the case of a set of different hospitals across the world, each of which stores X-ray images from their own patients. Sharing such medical information to the cloud for model training, or even between one another, may be undesirable (or even illegal), in many circumstances. With federated learning, however, models can be trained at each of the sites and using their own local data, such as at nodes 402 in FIG. 4. The resulting model parameters can then be aggregated to form a global model that has been trained using the X-ray images across all of the hospitals, but in a manner that does not require those images to actually be shared offsite.

However, in order to enable the debugging functions in a federated learning system, it may be necessary to understand and quantify the contribution of the individual local models described herein. By way of example, FIG. 5 shows a potential federated learning system 500 that could be implemented to train a global model 506 using medical data across a plurality of hospitals in different locations, although embodiments are not limited to such enumerated examples and aspects of the present disclosure may be applied to any federated learning system 500.

Figure 5:
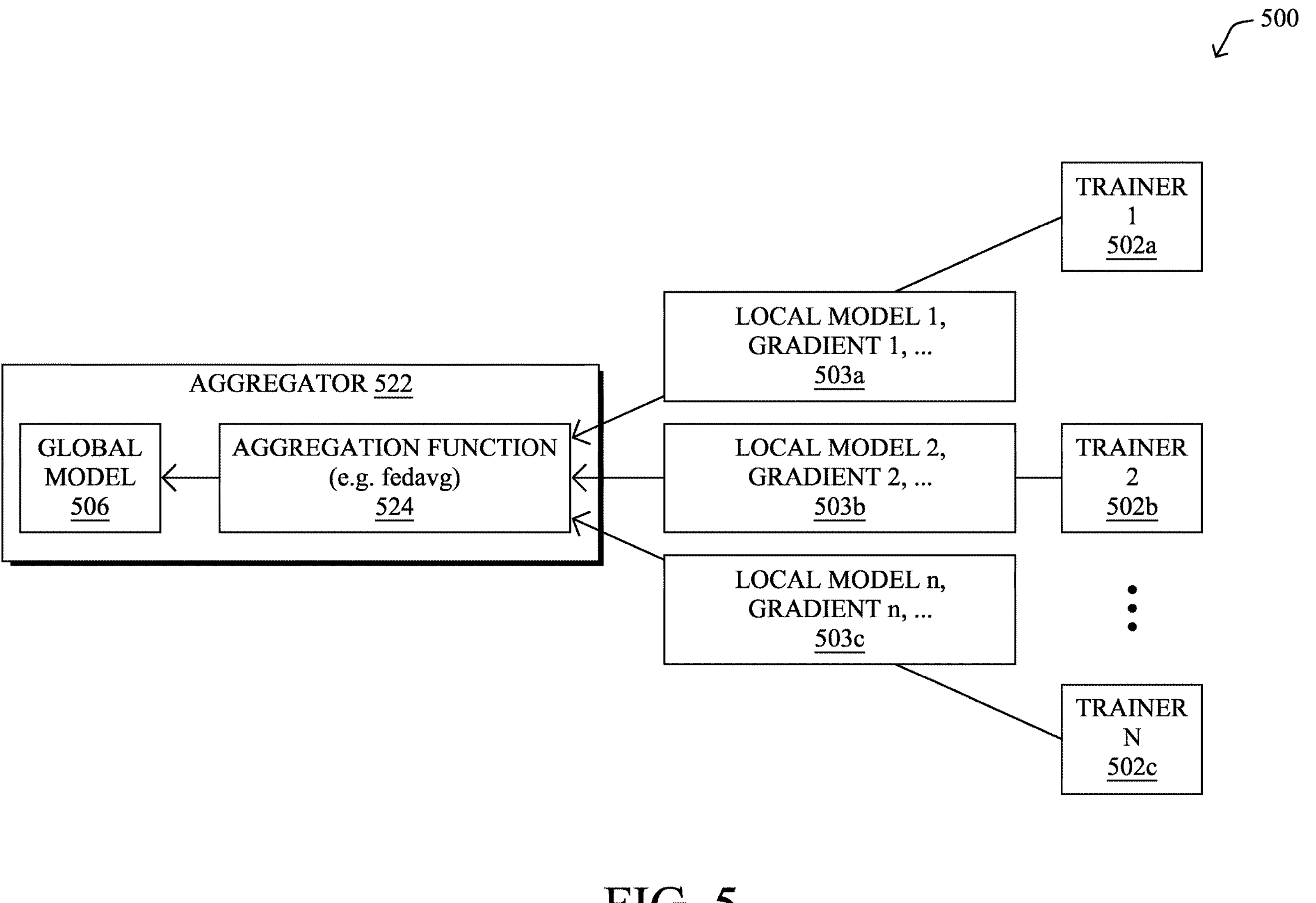
FIG. 5 illustrates an example of the collection of certain metrics during any given round of training.

FIG. 5 illustrates an example of the collection of certain metrics during any given round of training. In FIG. 5, data sets are trained at each of the nodes 502*a*-502*c* in the federated learning system 500. The trained data sets are then aggregated by the global model aggregator node 522 using an aggregation function 524 (e.g., a federated averaging algorithm, "fedavg") to form the global model 506. As discussed above, one of the main advantages of federated learning is that each trainer node 502*a*-502*c* does not need to send its training data externally, thereby allowing the global model 506 to be trained using data sets that may be restricted from being exported and/or exposed to external entities (e.g., due to local laws, regulations, company policy, etc.).

To debug the resulting global model 506, we first assume that the global model aggregator node 522 has a validation data set. Such a data set is typically used to evaluate the performance of a newly trained model using data for which the results are already known. For instance, assume that the global model 506 is trained using X-ray images to classify any given image as depicting a bone fracture or not. In that instance, the validation data set may comprise X-ray images for which these labels are already known. Thus, the validation may entail having the global model 506 classify the images in the validation data set and comparing the results to the ground truth information (i.e., to determine whether the global model 506 was able to correctly detect a fracture or not).

In some embodiments, at each round of aggregation, the federated learning system 500 may make a comparison between the newly built global model 506 with individual local models 503*a*-503*c* (e.g., the local models trained by the trainer nodes 502*a*-502*c*) and check the similarity between the global model 506 and local models 503*a*-503*c*. There can be several ways for similarity comparison. As described in more detail, herein, embodiments of the present disclosure can include at least two approaches:

- Comparing model parameters. In these embodiments, the similarity of the parameters of the various local models 503*a*-503*c* and the global model 506 can be measured and compared to generate a score (e.g., a model similarity score). These embodiments may be utilized in non-neural network models, such as regression models, etc.; and
- Comparing validation performance. In these embodiments, a validation operation involving the global model 506 and the local models 503*a*-503*c* can be performed using a validation data set. For example, each validation operation can produce a vector of validation outputs (e.g., classification results). By comparing the vector produced using the global model 506 and vectors produced using the local models 503*a*-503*c*, one or more similarity scores (e.g., cosine similarity scores, etc.) can be computed.

In general, a high similarity score means that the global model 506 is likely to be highly influenced by a local model 503*a*-503*c* used in comparison. In addition, by leveraging the validation output vectors and validation dataset, it may be possible to diagnose with what type of data the global model 506 and the local models 503*a*-503*c* perform poorly. These insights can be stored and/or visualized to assist engineers in debugging federated learning jobs. Further, with these insights, the engineers can quickly revise a given federated learning job (e.g., by excluding certain participants due to lack of contributions or harmful effects and/or by causing debugging operations to be performed on the local models to remediate errant data included in the local models).

It will be appreciated that the computation overhead of these approaches increases as the number of participants increases. Accordingly, the debugging functionality of the present disclosure may be enabled in a selectable manner (e.g., when the performance of the global model 506 is poor, either on demand or automatically based on a defined performance threshold).

A key challenge that may arise in the above scenarios and in other federated learning deployments is that the training data from one or more trainer nodes may become corrupted. For instance, one or more hospitals may provide inaccurate and/or corrupted data to the training models associated with a particular trainer node either inadvertently or, in a worse case, as a result of a nefarious actor, which can propagate inaccuracies throughout a federated learning system. Having the ability to utilize every trained model in a federated learning system is, however, valuable to the accuracy of the global model. However, because of complexities involved in debugging local models, corrupted local models are often filtered out of the global model and discarded. If the highest quality global model is desired, it would be beneficial to train the global model with as many local models as possible. Of course, doing so also typically requires a relatively large computational output and/or a relatively large processing resource consumption, as well. Consequently, debugging models in a federated learning system today is often a cumbersome and resource intensive task.

Debugging in Federated Learning Systems

The techniques introduced herein allow for debugging in federated learning systems through the selective deployment of debugging functions to different nodes of the federated learning system. More specifically, the techniques herein are able to conserve resources by only initiating debugging on particular nodes and/or under certain conditions, for example, when global model performance has degraded, etc. In the various embodiments, a debugging function can be a small size code that can be dispatched to clients and executed on demand, as different federated learning use cases and different sets of clients may require different debugging functions. The ability to selectively deploy debugging functions means that users are not stuck with only a pre-determined, static set of debugging functions, as is common in some previous approaches.

Accordingly, the techniques herein propose the following:

- Determining that performance of a global model has degraded;
- Causing the local (e.g., training) nodes to perform validation of their local models (i.e., run the local models using the same datasets that are used to test the performance of the global model);
- Rank the local nodes based on the validation results (i.e., based on performance of the local nodes perform relative to the global model);
- Request debugging metrics (e.g., data drift score, data sample similarity metrics, non-IID score, etc.) from the training nodes;
- Use the debugging metrics to determine a root cause of the degradation in performance of the global model; and
- Provide an indication of the root cause of the degradation of the global model.

Illustratively, the techniques described herein may be performed by hardware, software, and/or firmware, such as in accordance with federated learning control process 248, which may include computer executable instructions executed by the processor 220 (or independent processor of interfaces 210) to perform functions relating to the techniques described herein.

Specifically, according to various embodiments, a device makes a determination that performance of a global model generated by aggregating local models trained by a plurality of trainer nodes in a federated learning system has experienced a degradation. The device selects, in response to the determination, a particular trainer node from among the plurality of trainer nodes to generate debugging metrics. The device obtains the debugging metrics from the particular trainer node. The device provides an indication that the particular trainer node is a root cause of the degradation.

Figure 6:
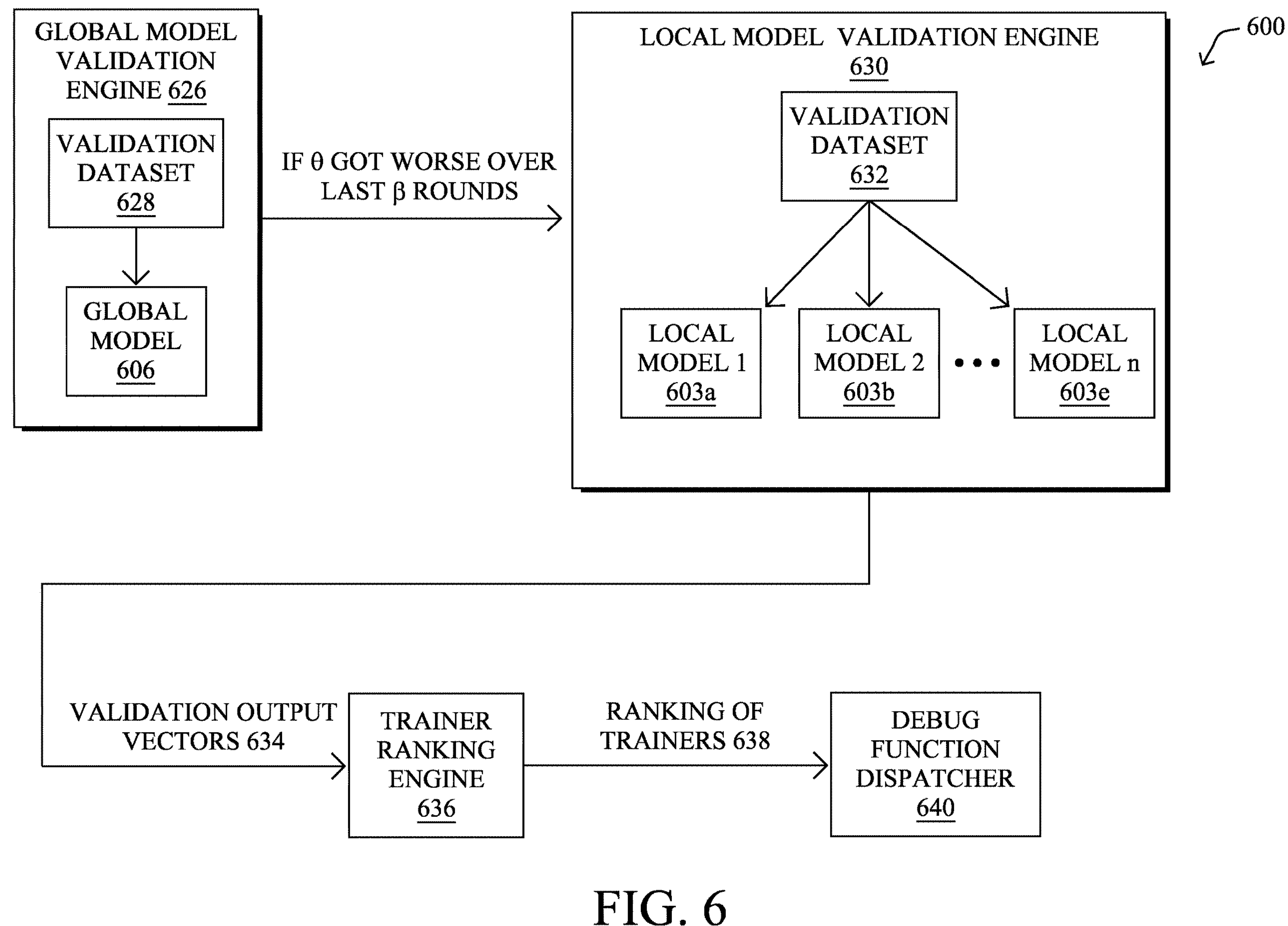
FIG. 6 illustrates an example of a debugging functionality.

Operationally, FIG. 6 illustrates an example of a debugging functionality, according to various embodiments. In FIG. 6, a global model validation engine 626 uses a validation dataset 628 to validate the global model 606. In some embodiments, this global model validation process can be executed using the validation dataset 628 in response to a determination that performance of the global model 606 has either experienced a degradation (e.g., the global model is performing worse than expected) or is experiencing a condition in which the global model 606 is not improving over a given number of rounds of training using the local models 603*a*-603*c*.

In other words, as shown in FIG. 6, if the performance of the global model 606 (i.e., as measured through model validation using the validation dataset 628) does not improve over a last given quantity of training rounds, a local model validation process may be triggered, for example, automatically. It is noted, however, that the local model validation process can be relatively resource heavy in comparison to execution of the global model validation process. Further, it will be appreciated that, if continuous debugging is enabled, the local model validation process may be executed all the time, as well.

In some embodiments, the local validation process can be executed by the local model validation engine 630. Similar to the global model validation process described above, the local model validation process can be executed using the validation dataset 632 in response to a determination that performance of the global model 606 has either experienced a degradation and/or in response to a determination that one or more of the local models 603*a*-603*c* is contributing to the degradation experienced by the global model 606.

As shown in FIG. 6, the local model validation engine 630 can, under certain conditions, generate validation output vectors 634, which can be provided to a trainer ranking engine 636. In some embodiments, the validation output vectors 634 can include information corresponding to whether or not the validation dataset 632 matched (or significantly matched) data associated with the local models 603*a*-603*c*. The trainer ranking engine 636 can process the validation output vectors 634 to generate a ranking of trainers 638. The ranking of trainers 638 can be based on information associated with a quality (e.g., an accuracy of training datasets) provided by the local models 603*a*-603*c*. For example, the ranking of trainers 638 can provide a ranked list of the local models 603*a*-603*c* based on an accuracy and/or a quality of training data provided by the local models 603*a*-603*c* to a federated learning system (e.g., the federated learning system 500 of FIG. 5).

In some embodiments, the ranking of trainers 638 can rank the local models 603*a*-603*c* on a scale where the "worst" local models 603*a*-603*c* are given a high score and the "best" local models 603*a*-603*c* are given a low score. For example, in the non-limiting embodiment illustrated in FIG. 6 in which there are three local models 603*a*, 603*b*, and 603*c*, the ranking of trainers 638 can determine that the local model 603*b* is "better" than the local model 603*a* and that the local model 603*c* is "worse" than both the local models 603*b* and 603*a*. In this non-limiting scenario, the local model 603*b* can be given a "highest" ranking (e.g., a ranking of "1"), the local model 603*a* can be given a second "highest" ranking (e.g., a ranking of "2"), and the local model 603*c* can be given a "lowest" ranking (e.g., a ranking of "3") thereby indicating that the local model 603*c* is the "worst" local model and therefore may be a candidate for debugging operations in accordance with the disclosure.

Embodiments are not so limited, however, and the ranking of the trainers 638 can be in a different order such that the "lowest" ranked local model (the local model 603*c* in this non-limiting example) can be given a ranking score of "1" while the "highest" ranked local model (the local model 603*b* in this non-limiting example) can be given a ranking score of "3." It will be appreciated that any ranking system may be employed by the ranking of trainers 638 provided that the ranking system utilized discerns between performance of the local models 603*a*-603*c* with respect to the impact such local models 603*a*-603*c* have on the global model 606. It is further contemplated within the scope of the disclosure that, in the event that two or more local models 603*a*-603*c* have a same or similar ranking score, further criteria may be considered to distinguish the performance and/or the impact on performance of the global model 606 that is attributable to the local models 603*a*-603*c*.

Continuing with the example of FIG. 6, mechanisms that allow an engineer and/or user to specify the conditions under which debugging is to be triggered are contemplated withing the scope of the disclosure. For instance, the output of the local model validation process, as performed by the local model validation engine 630, can be a set of validation output vectors 634 that represent the results of validation operations performed (in this non-limiting example) on the local models 603*a*-603*c*. As mentioned above, these results may be used as input to a trainer ranking engine 636. In various embodiments, the trainer ranking engine 636 carries out comparison operations involving the vectors of validation results and examines other contribution factors such as the number of data samples used.

Figure 7:
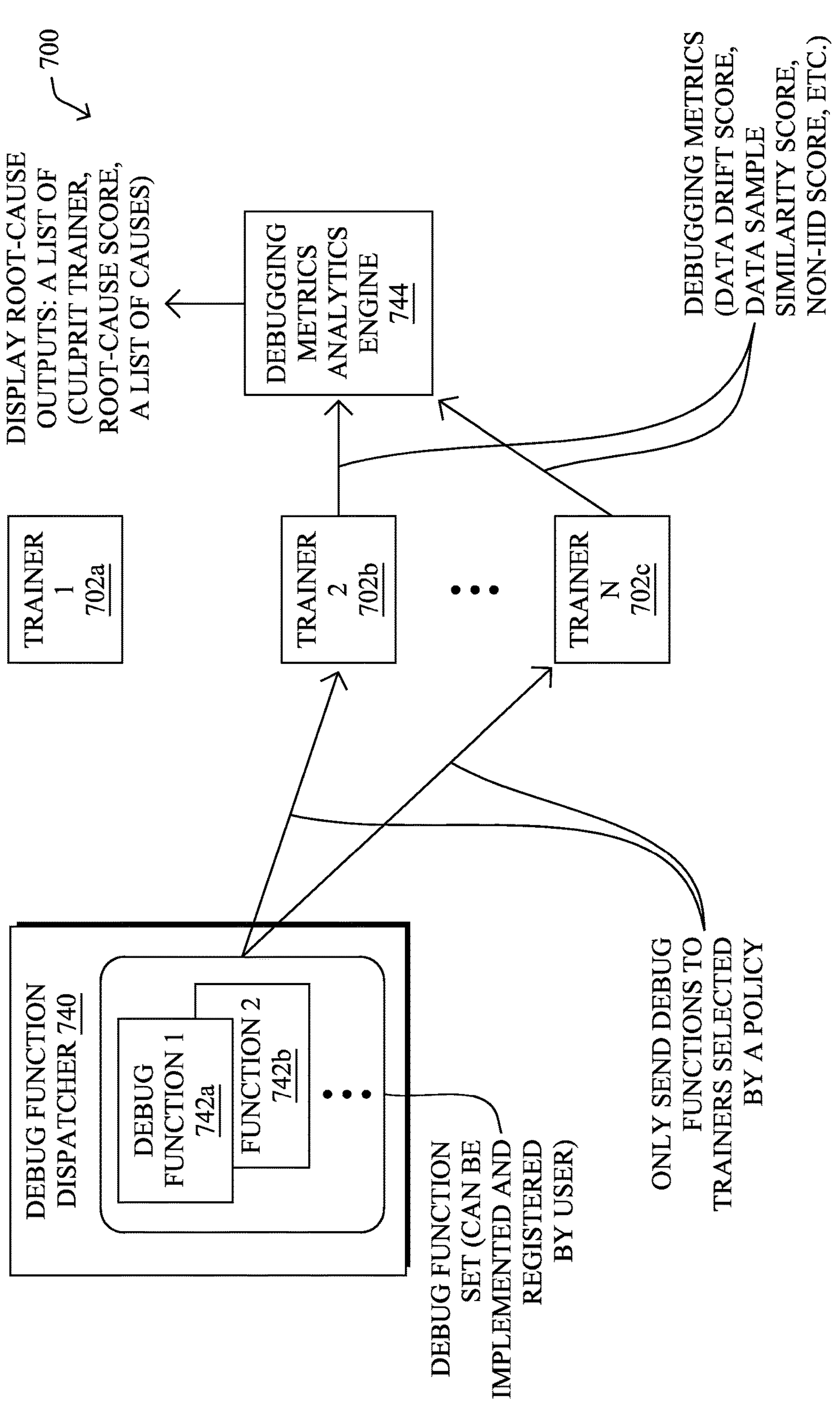
FIG. 7 illustrates an example of a debug function dispatcher dynamically deploying debugging functions into a federated learning system.

This information can be shared during training operations performed by the trainers (e.g., the trainer node 502*a*-502*c* illustrated in FIG. 5, herein) in accordance with federated learning practices. However, by leveraging these pieces of information, the trainer ranking engine 636 can produce a list of trainers (with associated a score for the influence, etc., as discussed in more detail, herein) that may have influenced the global model 606. The ranking information (e.g., the ranking of trainers 638) may then be provided to the debug function dispatcher 640, which is responsible for selecting trainers to dispatch a set of debugging functions. In various embodiments, the trainer selection can be done through some policy (e.g., select all, select top k trainers, or select by threshold, etc.). In such embodiments, a user may set a policy and may register debugging functions for a particular training job (e.g., via CLI, GUI, or other suitable input method). FIG. 7, below, shows an example of the debug function dispatcher 640 dynamically deploying debugging functions into the federated learning system 600.

FIG. 7 illustrates an example of a debug function dispatcher 740 dynamically deploying debugging functions into a federated learning system 700. Once the debugging functions are dispatched to the selected trainer nodes (e.g., the trainer nodes 502*a*-502*c* illustrated in FIG. 5, herein), the debugging functions produce debugging metrics and send them to the debugging metrics analytics engine 744, which can be configured to perform one or more debug functions 742*a*-742*b*. In the course of producing debugging information, the debug functions 742*a*-742*b* protect (and therefore do not) leak any sensitive information in accordance with federated learning system requirements. In various embodiments, the federated learning system 700 may have a predefined set of debug functions 742*a*-742*b* and/or a register of debugging functions, among other possibilities. In some embodiments, the debug functions 742*a*-742*b* may first require approval, such as from a system administrator or other automated policy engine, to further ensure that sensitive information is not leaked in the processes described herein, although embodiments are not so limited.

Non-limiting examples of debugging metrics that can be utilized in connection with the disclosure can include a data drift score, a data sample similarity score, an independently and identically distributed (IID) random variable score, a non-IID score, etc., all of which may be computed locally without revealing sensitive private information. For instance, a data drift score can be calculated by examining data set distribution changes between rounds in a trainer. A data sample similarity score can be calculated by examining each pair of data samples in a trainer at the current round. In some embodiments, an IID or non-IID score can be calculated by leveraging multi-party computation (MPC) technology to ensure that sensitive information that may be known to the trainer nodes 702*a*-702*c* is not exposed or otherwise leaked.

In various embodiments, the debugging metrics analytics engine 744 can analyze the collected metrics to determine a root cause for degradation of the global model (e.g., the global model 606 of FIG. 6). Further, the debugging metrics analytics engine 744 can analyze the collected metrics to produce a list of tuples that include information relevant to engineers and/or users to assist in debugging the training models discussed herein. By way of example, the list of tuples can include an identification of a trainer node (e.g., a "trainer id"), a value corresponding to a score attributed to a trainer node that may be a root cause of degradation experienced by the global model (e.g., a root-cause score), and/or a list of potential causes for the degradation experienced by the global model, among other possibilities. Therefore, engineers and/or users can make judicious decisions that allow for meaningful actions to remediate and/or mitigate adverse effects of the local models described herein on the global model to be taken. Further, such engineers and/or users can determine when it is judicious to invoke debugging operations involving the trainer nodes in an effort to improve the overall quality of the global model, although embodiments are not limited merely to human interaction to invoke the operations described herein, as discussed above.

Figure 8:
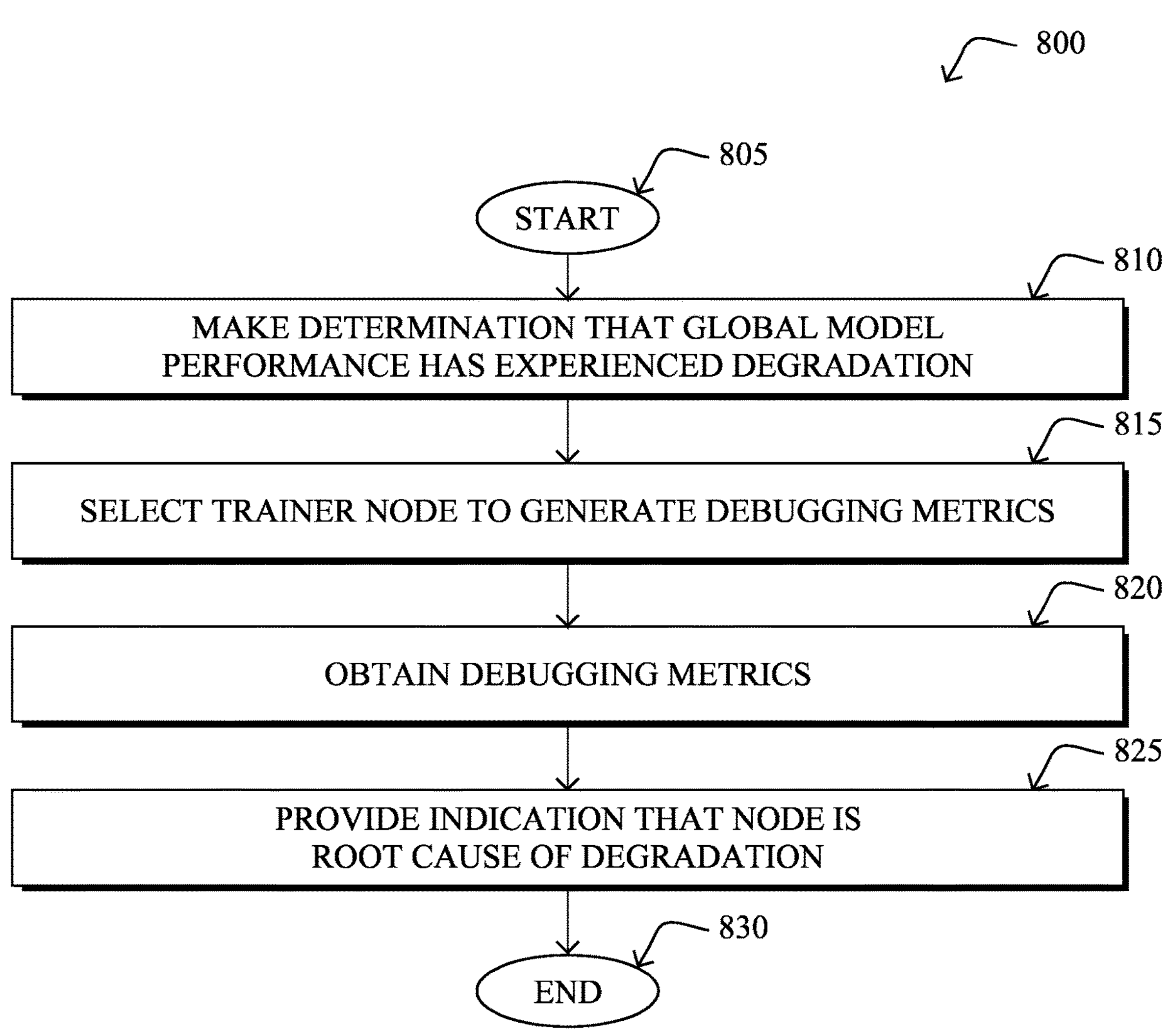
FIG. 8 illustrates an example simplified procedure for performing debugging in a federated learning system.

FIG. 8 illustrates an example simplified procedure 800 (e.g., a method) for performing debugging in a federated learning system, in accordance with one or more embodiments described herein. For example, a non-generic, specifically configured device for a federated learning system (e.g., device 200), may perform procedure 800 by executing stored instructions (e.g., federated learning control process 248). The procedure 800 may start at step 805, and continues to step 810, where, as described in greater detail above, the device (e.g., a controller, another node in the federated learning system, etc.) may make a determination that performance of a global model generated by a federated learning system has experienced a degradation. As discussed above, the global model may be generated by aggregating local models trained by a plurality of trainer nodes in the federated learning system. In various embodiments, the determination that the performance of the global model generated by the federated learning system has experienced the degradation can be made using a validation data set, as described in more detail above. In various embodiments, the device can deploy one or more debugging functions to the particular trainer node based, at least in part, on the debugging metrics from the particular trainer node. In further embodiments, a request can be sent to the particular trainer node to obtain the debugging metrics from the particular trainer node. In yet another embodiment, the device can select the particular trainer node based on a determined degree of influence a local model executed on the particular trainer node had on the global model.

At step 815, as detailed above, the device may select, in response to the determination made at step 810, a particular trainer node from among the plurality of trainer nodes to generate debugging metrics. The debugging metrics include a data drift score and/or an independent and identically distributed data score, among other possibilities. In various embodiments, the device can select the particular trainer node based on a determined degree of influence a local model executed on the particular trainer node had on the global model. For example, the device can rank the plurality of trainer nodes based, at least in part, on a determined degree of influence each of the local models had on the global model to generate a ranked list of trainer nodes and select the particular trainer node based, at least in part, on the ranked list of trainer nodes.

At step 820, the device may obtain the debugging metrics from the particular trainer node. In various embodiments, the debugging metrics and the indication do not reveal any training data used by the particular trainer node to generate a local model associated with the particular trainer node.

At step 825, as detailed above, the device may provide an indication that the particular trainer node is a root cause of the degradation. In various embodiments, the indication indicates that the degradation is attributable to a training dataset associated with the particular trainer node being aggregated into the global model. Embodiments are not so limited, however, and in some embodiments, the indication comprises a root cause score associated with the particular trainer node.

Procedure 800 then ends at step 830.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for performance of debugging in a federated learning system. More specifically, by identifying trainer nodes that contribute to degradation of a global model that has aggregated datasets provided by such trainer nodes and selectively generating debugging metrics, performance of the global model can be improved.

While there have been shown and described illustrative embodiments that provide for debugging in a federated learning system, it is to be understood that various other adaptations and modifications may be made within the spirit and scope of the embodiments herein. For example, while certain embodiments are described herein with respect to machine learning workloads directed towards model training, the techniques herein are not limited as such and may be used for other types of machine learning tasks, such as making inferences or predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:

making, by a device, a determination that performance of a global model generated by a federated learning system has experienced a degradation, wherein the global model was generated by aggregating local models trained by a plurality of trainer nodes in the federated learning system;

obtaining first validation data related to validation of the global model:

obtaining second validation data related to validation of a local model associated with a particular trainer node from among the plurality of trainer nodes;

comparing the first validation data to the second validation data to determine a degree of influence the local model associated with the particular trainer node had on the global model;

selecting, by the device, the particular trainer node from among the plurality of trainer nodes based, at least in part, on the degree of influence being greater than a value;

obtaining, by the device, debugging metrics from the particular trainer node based, at least in part, on selecting the particular trainer node; and providing, by the device, an indication that the particular trainer node is a root cause of the degradation.

2. The method of claim 1, further comprising making, by the device, the determination that the performance of the global model generated by the federated learning system has experienced the degradation using a validation data set.

3. The method of claim 1, further comprising deploying, by the device, one or more debugging functions to the particular trainer node based, at least in part, on the debugging metrics from the particular trainer node.

4. The method of claim 1, further comprising sending a request to the particular trainer node to obtain the debugging metrics from the particular trainer node.

5. The method of claim 1, further comprising:

ranking, by the device, the plurality of trainer nodes based, at least in part, on a determined degree of influence each of the local models had on the global model to generate a ranked list of trainer nodes; and wherein selecting the particular trainer node is based, at least in part, on the ranked list of trainer nodes.

6. The method of claim 1, wherein the debugging metrics and the indication do not reveal any training data used by the particular trainer node to generate the local model associated with the particular trainer node.

7. The method of claim 1, wherein the indication indicates that the degradation is attributable to a training data set associated with the particular trainer node being aggregated into the global model.

8. The method of claim 1, wherein the indication comprises a root cause score associated with the particular trainer node.

9. The method of claim 1, wherein the debugging metrics include a data drift score.

10. The method of claim 1, wherein the debugging metrics include an independent and identically distributed data score.

11. An apparatus, comprising:
one or more network interfaces;
a processor coupled to the one or more network interfaces; and
a memory configured to store instructions that, when executed by the processor, configure the processor to:
make a determination that performance of a global model generated by a federated learning system has experienced a degradation, wherein the global model was generated by aggregating local models trained by a plurality of trainer nodes in the federated learning system;
obtain first validation data related to validation of the global model;
obtain second validation data related to validation of a local model associated with a particular trainer node from among the plurality of trainer nodes;
compare the first validation data to the second validation data to determine a degree of influence the local model associated with the particular trainer node had on the global model;
select the particular trainer node from among the plurality of trainer nodes based, at least in part, on the degree of influence being greater than a value;
obtain debugging metrics from the particular trainer node; and
provide an indication that the particular trainer node is a root cause of the degradation.

12. The apparatus of claim 11, wherein the processor is configured to make the determination that the performance of the global model generated by the federated learning system has experienced the degradation using a validation data set.

13. The apparatus of claim 11, wherein the processor is further configured to deploy one or more debugging functions to the particular trainer node based, at least in part, on the debugging metrics from the particular trainer node.

14. The apparatus of claim 11, wherein the processor is further configured to send a request to the particular trainer node to obtain the debugging metrics from the particular trainer node.

15. The apparatus of claim 11, wherein the processor is further configured to:
rank the plurality of trainer nodes based, at least in part, on a determined degree of influence each of the local models had on the global model to generate a ranked list of trainer nodes;
wherein the processor is configured to select the particular trainer node based, at least in part, on the ranked list of trainer nodes.

16. The apparatus of claim 11, wherein the debugging metrics and the indication do not reveal any training data used by the particular trainer node to generate the local model associated with the particular trainer node.

17. The apparatus of claim 11, wherein the indication indicates that the degradation is attributable to a training data set associated with the particular trainer node being aggregated into the global model.

18. A tangible, non-transitory, computer-readable medium storing program instructions that cause a device of a federated learning system to execute a process comprising:
making, by the device, a determination that performance of a global model generated by the federated learning system has experienced a degradation, wherein the global model was generated by aggregating local models trained by a plurality of trainer nodes in the federated learning system;
obtaining first validation data related to validation of the global model;
obtaining second validation data related to validation of a local model associated with a first trainer node from among the plurality of trainer nodes;
analyzing the first validation data and the second validation data;
determining a degree of influence the local model associated with the first trainer node had on the global model;
selecting, by the device, the first trainer node from among the plurality of trainer nodes based, at least in part, on the degree of influence satisfying one or more criteria;
obtaining, by the device, one or more debugging metrics from the first trainer node; and
providing, by the device, an indication that the first trainer node is a root cause of the degradation.

19. The tangible, non-transitory, computer-readable medium of claim 18, wherein obtaining the first validation data includes executing the global model based, at least in part on, a validation data set, the first validation data corresponding to output from the global model.

20. The tangible, non-transitory, computer-readable medium of claim 18, wherein the process further comprises:
ranking the plurality of trainer nodes based, at least in part, on a degree of influence each of the local models had on the global model to generate a ranked list of trainer nodes;
wherein selecting the first trainer node includes determining, based at least in part on the ranked list of trainer nodes, that the degree of influence of the first trainer node is greater than the degree of influence of a second node of the plurality of trainer nodes.

* * * * *